(12) United States Patent
Poivet et al.

(10) Patent No.: US 8,794,583 B2
(45) Date of Patent: Aug. 5, 2014

(54) DEVICE FOR SUPPORTING PHOTOVOLTAIC CELL PANELS, SUPPORT SYSTEM AND INSTALLED ASSEMBLY

(75) Inventors: Alain Poivet, Versailles (FR); Eric Chameau, Rocquencourt (FR)

(73) Assignee: KBFX LLC, Lewes, DE (US)

( * ) Notice: Subject to any disclaimer, the term of this patent is extended or adjusted under 35 U.S.C. 154(b) by 219 days.

(21) Appl. No.: 13/129,378

(22) PCT Filed: Nov. 17, 2009

(86) PCT No.: PCT/FR2009/001322
§ 371 (c)(1),
(2), (4) Date: May 13, 2011

(87) PCT Pub. No.: WO2010/055235
PCT Pub. Date: May 20, 2010

(65) Prior Publication Data
US 2011/0215213 A1    Sep. 8, 2011

(30) Foreign Application Priority Data
Nov. 17, 2008  (FR) .................................... 08 06419

(51) Int. Cl.
*A47B 97/00* (2006.01)

(52) U.S. Cl.
USPC ............... 248/500; 248/228.2; 248/316.4; 52/173.3

(58) Field of Classification Search
USPC .................. 52/173.3, 489.1; 248/228.2, 500, 248/222.14, 316.1
See application file for complete search history.

(56) References Cited

U.S. PATENT DOCUMENTS

2010/0155547 A1*   6/2010   Kobayashi ................ 248/121

FOREIGN PATENT DOCUMENTS

| DE | 20219173 | 2/2004 |
|----|----------|--------|
| DE | 202005007855 | 8/2005 |
| DE | 202005012993 | 11/2005 |
| DE | 102005039495 | 3/2007 |
| JP | 11013224 | 1/1999 |
| JP | 2000154625 | 6/2000 |
| JP | 2001164713 | 6/2001 |
| JP | 2003343057 | 12/2003 |
| WO | 2010055235 | 5/2010 |

* cited by examiner

*Primary Examiner* — Amy J Sterling
(74) *Attorney, Agent, or Firm* — Sheppard Mullin Richter & Hampton LLP

(57) ABSTRACT

Device for supporting photovoltaic cell panels, which is formed from a section with a height between 5 and 25 cm, comprising a central portion (1), two gutters (2) symmetrical with respect to the support and running along the section over the entire length thereof, a retaining rail (3) at the base, fastening means (4), for fastening two photovoltaic cell panels (5), a thermal insulation, and a complementary sealing device.

14 Claims, 9 Drawing Sheets

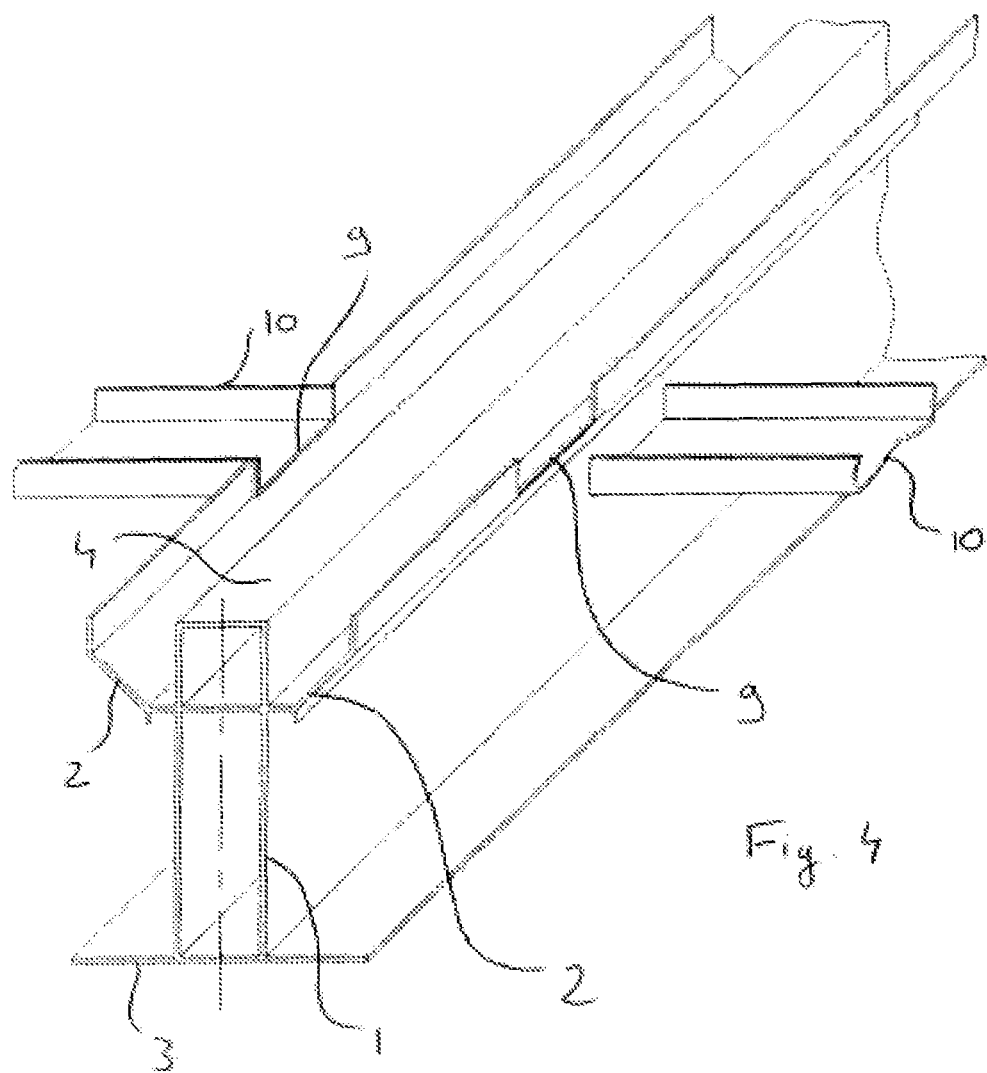

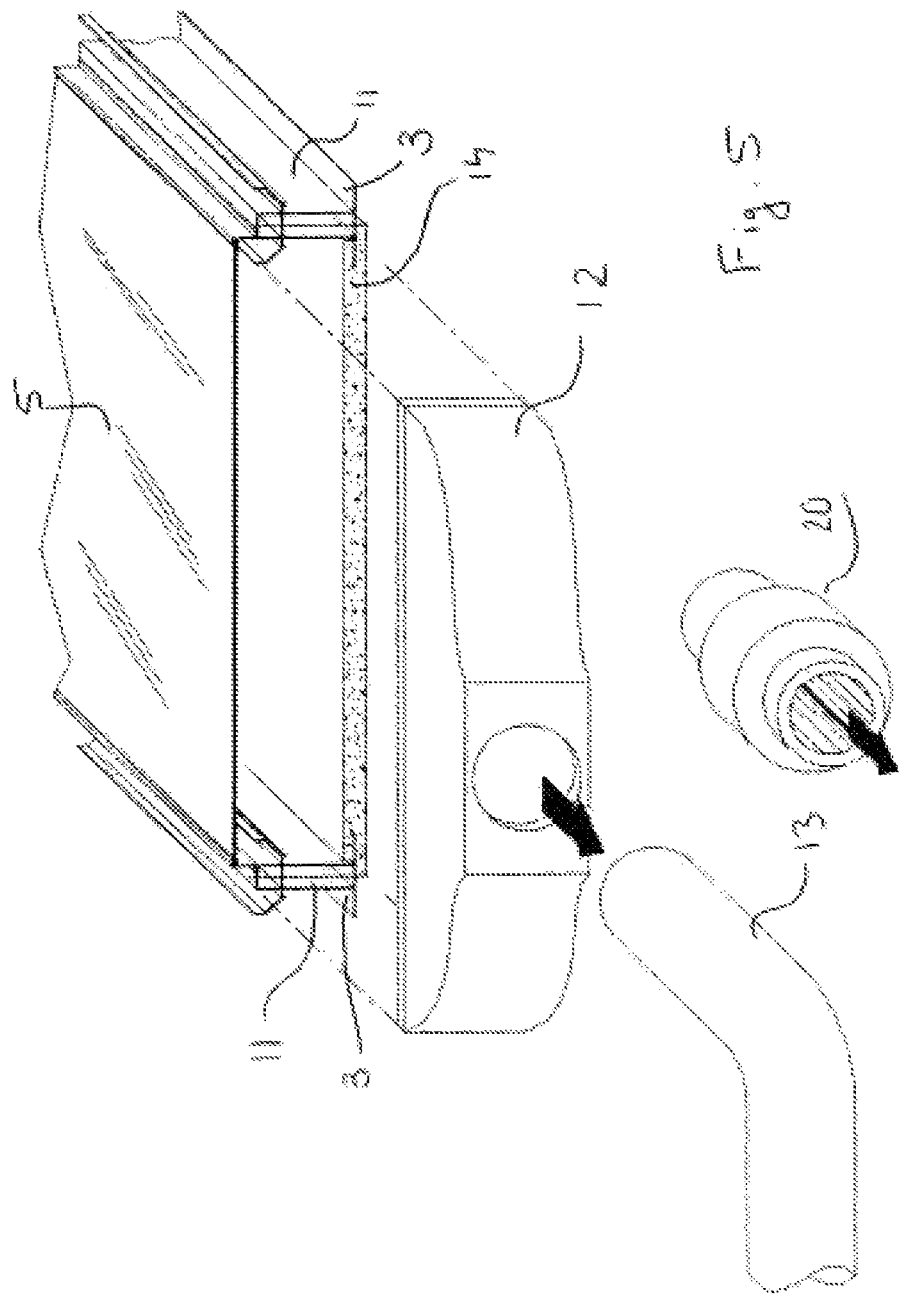

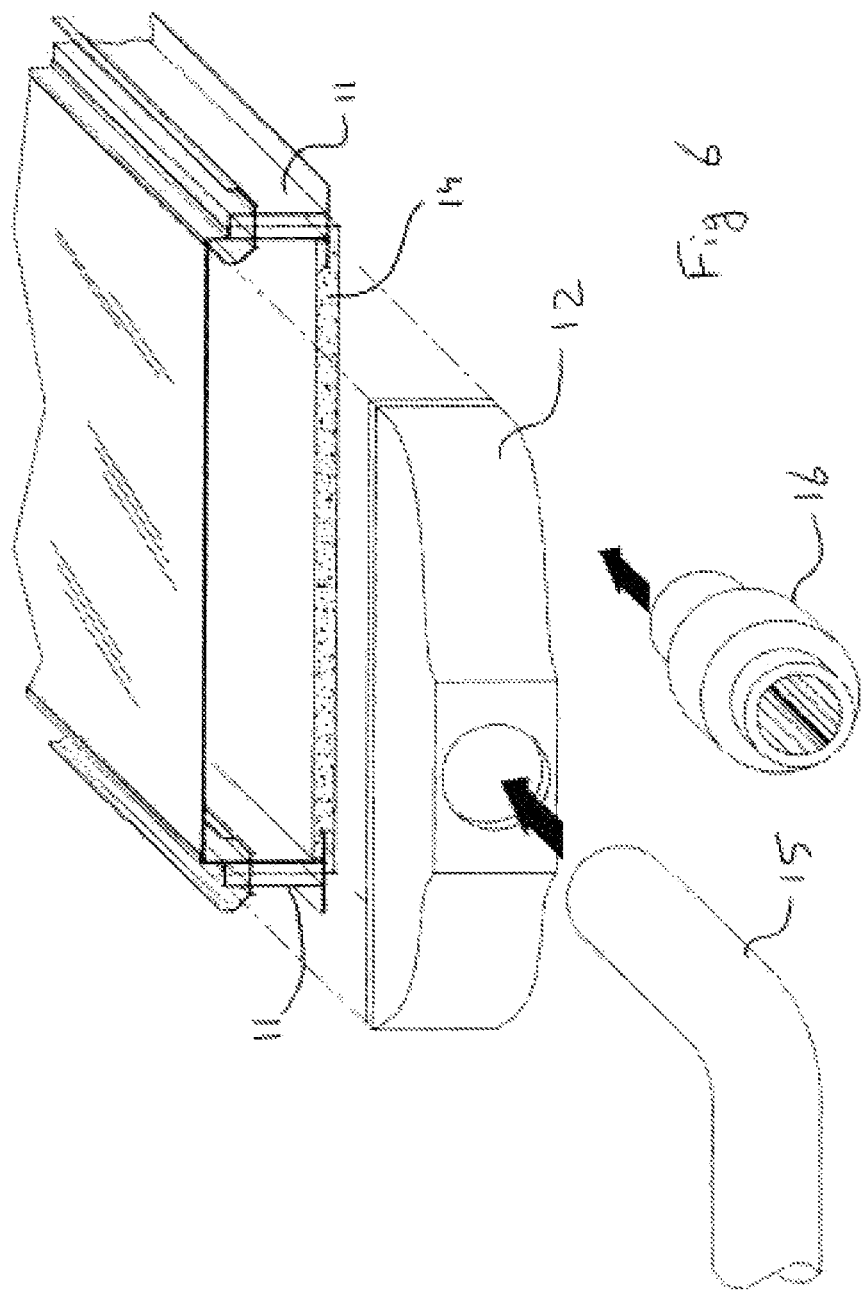

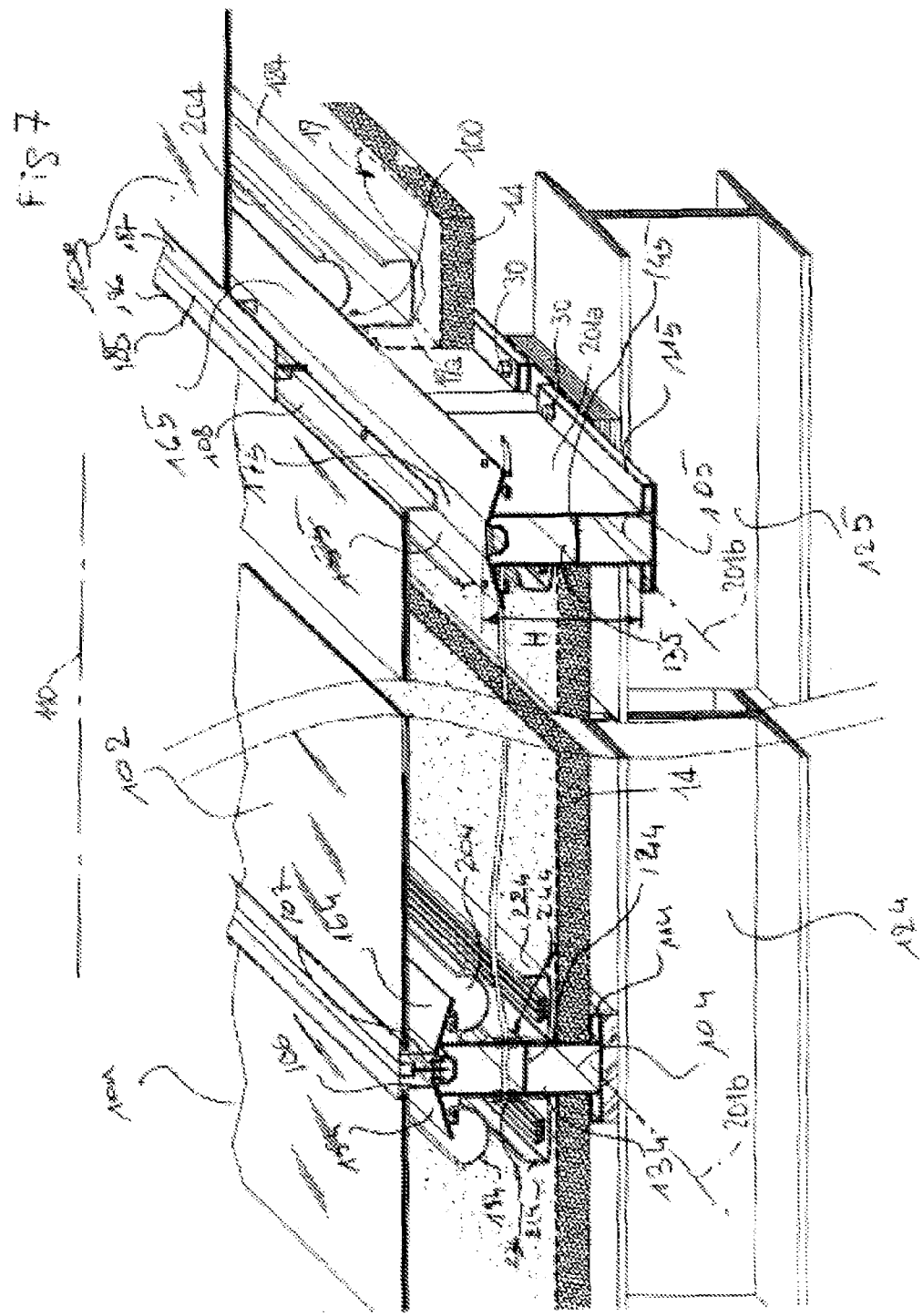

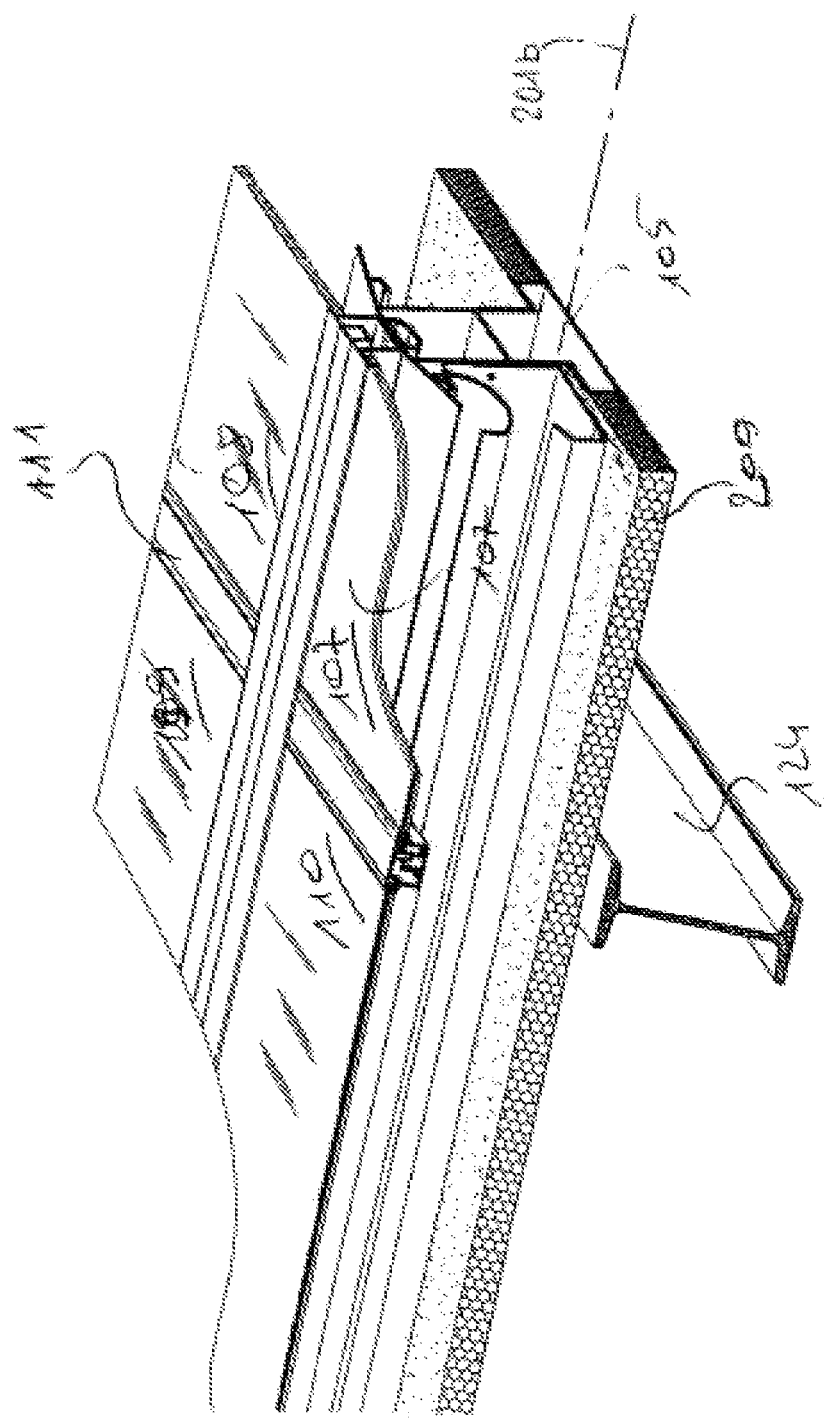

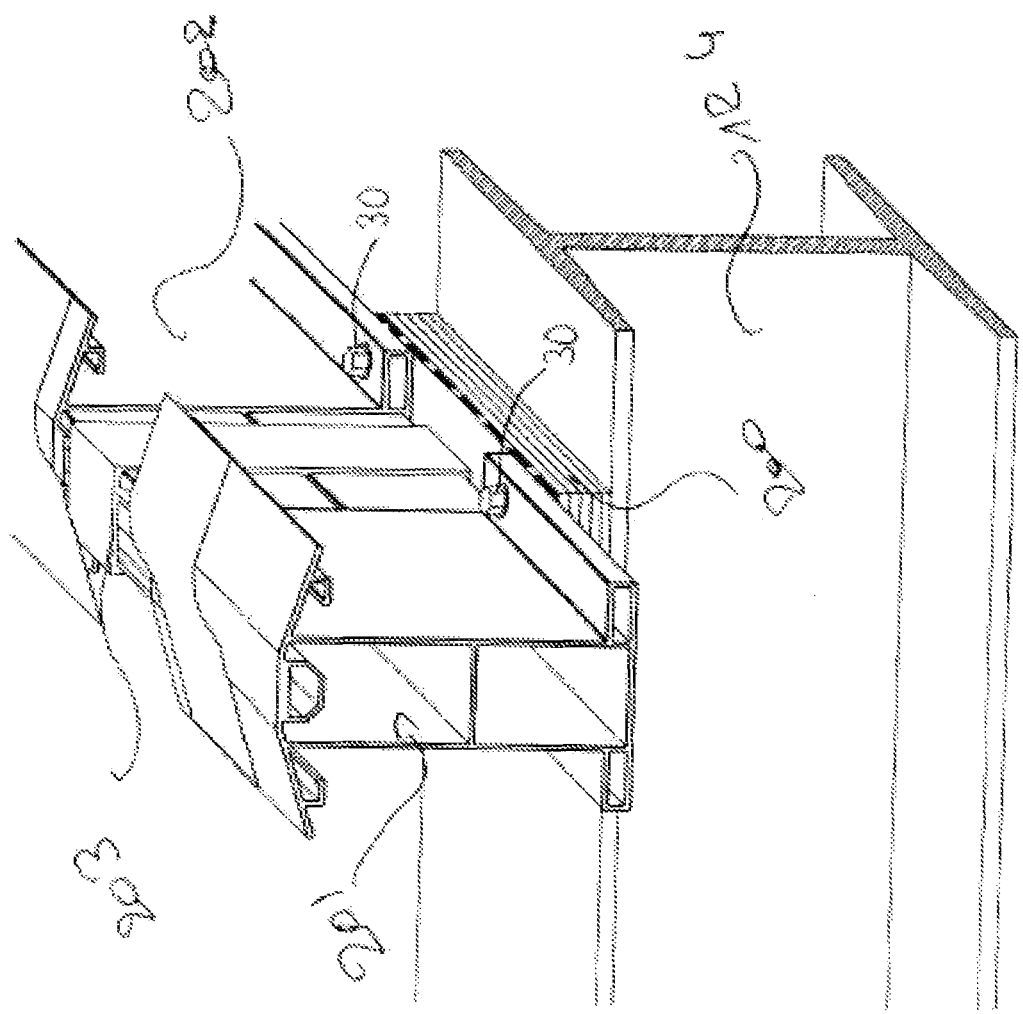

DEVICE FOR SUPPORTING PHOTOVOLTAIC CELL PANELS, SUPPORT SYSTEM AND INSTALLED ASSEMBLY

This invention involves a photovoltaic cell securing device.

In particular, it involves a device for supporting photovoltaic cell panels, an installation that implements these panels under the so-called "integration" regulation of photovoltaic cells on roofs, and an assembly that comprise one and/or the other installed on the front of a building or on a roof.

PRIOR STATE OF THE ART

Several manufacturers have studied photovoltaic cell support systems for roofs, in order to meet the integration codes, aimed at replacing roofs by photovoltaic cell panels, such as Schuco (registered trademark) and MSK (registered trademark). But such solutions are inadequate.

In the case of Schuco (registered trademark), the photovoltaic panels are installed on a steel tray which is not in accordance with the spirit of the "integration" regulation because the cover is not replaced by the photovoltaic system. On the contrary, first one builds an impervious roof on which panels are placed. Schuco (registered trademark) also proposes a declined (?) system of hot water thermal solar panels, but with serious limitations for usage (only operates under certain conditions and surrounded by existing roofs).

MSK (registered trademark) proposes a system which offers the advantage of proposing panels for which the aluminum frame is designed to ensure a first level of imperviousness. But the MSK system (registered trademark) is designed for small-sized systems, such as for individual houses. It is designed for short lengths, with little ventilation, with little water removal or evacuation and is scheduled to be mounted onto specifically designed wooden framing. Circulation of wires is not foreseen. The impervious solution is based on the imperviousness between the photovoltaic panels, but does not provide for any additional protection. Thermal insulation is not integrated. Among the existing solutions for the French requirement, besides Schuco (registered trademark) and MSK (registered trademark) mentioned before, one finds essentially overlapping panel installation systems such as for tiles (Photowatt, Conergy, registered trademarks).

All of these systems are poorly integrated. They pose cast shadow problems and above all, they only support strong slopes and small mechanical stress. As such, they cannot be used in the tropics. They require large overlaps and as such lots of unused space. These systems do no permit an efficient ventilation. They are rather designed for individual houses in metropolitan France.

Some embodiments exist, frequently with little satisfaction, and with little efficiency, because on the one hand, they are often dark glazed panels mounted in the middle of an existing tile or slate roof with obvious problems of connection (for instance, some try to imitate the installation of overlapping tiles). There are obvious problems of performance and efficiency by reason of the heat accumulation and problems of imperviousness.

We also know about the German patent application DE202005007855 which describes a device for supporting photovoltaic cell panels with a panel maintaining section which extends over a first direct, secured onto a second section forming a spacer, and which extends according to a second direction perpendicular to the first one.

This solution is not satisfactory because the two sections form obstacles for air circulation in the space formed between the roof or the wall, and the panels. It does not permit to create a duct oriented in the direction of the slope, for optimal removal of the hot air.

Then there are Japanese patents JP2000154625 and JP110103224 which describe photovoltaic panel maintenance sections made up of an assembly of beams with little height, on which panel holding frames are screwed. These solutions are not satisfactory either because they do not permit proper removal of the hot air resulting from the heated solar panels.

PURPOSE OF THE INVENTION

The installation of photovoltaic systems often runs into problems of an architectural nature or of the "building engineering" type. Indeed, putting in place of photovoltaic sensors on a building poses numerous architectural and technical problems. That is what integration is called. The question is how to secure the sensors while complying with the standards involving snow and wind resistance, while ensuring air and water tightness, while ensuring thermal insulation, circulation of electric wires, expansion resistance while permitting maintenance.

In parallel, one must guarantee the performance or efficiency of the photovoltaic system, while taking into account optimal slopes (which may lead to lesser slopes than what roofers generally admit), thanks to thermal control, cleaning or else the absence of cast shadows. Finally, the photovoltaic system emits heat which affects its efficiency. Consequently, on the one hand, one must remove this heat and on the other hand, in certain cases, it must be recovered to heat the building.

The six major problems are:
Imperviousness or tightness;
ventilation;
the interface with the frame;
mechanical resistance;
simplicity of installation; and
heat recovery The purpose of the systems developed abroad was not to "replace" the roof or the existing front of the building (because this is a requirement which originated in France and which will have international uses) but rather of being placed on top, which is much simpler.

The invention is aimed at permitting the installation of photovoltaic cell panels taking into account at least several, or even all, of the six problems mentioned, in order to permit a technically appropriate integration towards the replacement of classic roofs.

In particular, the invention is aimed at correcting the inconveniences of the solutions of the prior state of the art, by improving air circulation by convection or by mechanical ventilation, in open chambers formed between the building surface and the rear surface of the photovoltaic panels. Beneficially, these chambers are closed off laterally by sections forming hot air evacuation channels.

The invention involves as such a device for supporting photovoltaic cell panels consisting of a section between 5 and 25 cm high, comprising a central portion, two symmetric gutters with respect to the support and running along the full length of the section, a rail to hold it to the base and securing means for two photovoltaic cell panels. Beneficially, this "height" H shall be that of the central portion. At least, this takes care of problems two and four.

In special embodiment modes:
the rail holding it to the base of the central portion supports or sits in a rigid or semi-rigid thermal insulation;

the thermal insulation is covered with an impervious sheet running over the length of the central portion to ensure a second level of imperviousness or tightness;

two gutters are placed at the low end of the central portion of the section to permit a cable way support;

openings located under the gutters at the high part, and above the gutters at the low part, in order to permit a transversal wire passage way;

slots located on the outside vertical edges of the gutters permit to position transversal gutters to collect water coming in at the photovoltaic cell plate junctions.

The invention involves also a photovoltaic panel support system, by installing two devices for supporting photovoltaic cell panels in which the two devices for supporting photovoltaic cell panels are installed in parallel according to a spacing defined by the width of the photovoltaic cell plate to be installed.

In special embodiment modes:

a connecting piece permits linking the ventilation area to an air extraction device to recover the heat produced by the photovoltaic panel operation;

a connecting piece permits linking the ventilation area to an air blowing device to evacuate or remove the heat produced by the photovoltaic cell panel operation.

The rail provides for the mechanical securing of the covering or front components. On the roof, it sits on transversal frame purlins, for which the spacing will be calculated on the basis of the climate constraints of the location, or on longitudinal rafters in case of a traditional wooden frame. The photovoltaic panels are screwed to the rail on top, which provides a very great structural rigidity to the assembly as well as a non-corrosion guarantee.

The rail system permits obtaining a surface for placing the panels perfectly flat, irrespective of the deformities or irregularities of the frame, thanks to a wedging system which is adjustable at each supporting point. A laser adjustment can be made during the installation of the rails so as to obtain perfect flatness.

Approved resilient parts are placed at the contact points between the aluminum rail and the steels works to prevent chemical problems.

The rail is completed with plastic junction pieces which at the same time permit to ensure continuity of the flows and to absorb thermal expansions.

In the case of using MSK panels (registered trademark), most of the rain water flows onto the panels and is collected by a gutter at the low end. The lateral channels of the rail collect all of the residual water and drain it into the gutter. In the case of modules of another type, a transversal recovery system of the water between panels permits bringing all runoffs into the main channel. Consequently, not a drop of water can create a leak. However, a second system provides for additional security. The insulating plate at the low end sits in the main rail sections which permits it to be installed imperviously and consequently provides for a second completely impervious or tight surface. This plate is made up of a rigid or semi-rigid thermal insulating material which sits in-between 2 longitudinal rails. It is covered with an impervious skin or sheet, which makes it fully impervious. This plate is a commercial product, may be simply modified. The impervious sheet provides for an overlap of one plate onto the other preventing any leak or backup of water. Consequently, it is a system with dual imperviousness.

Air tightness can be considered in two ways. Tightness of the building and tightness of the system itself.

The tightness of the building is provided by the continuity of the insulating plates over the full surface.

Tightness of the system itself is what permits considering the whole space between 2 rails as a ventilation duct. The air is trapped between the rails, the insulating sub-face and the panels on top. Transversal tightness is provided by the rails. At the holes for passing through the wires, an impervious device is put in place.

The purpose of ventilation is to evacuate or remove the calories produced by the photovoltaic system, or even to recover them to heat the building.

The height of the air strip under the panels permits natural ventilation by convection whenever possible. It suffices to put in place protections against incoming rain water at the ends.

When the need for ventilation is greater or more constant, a mechanical ventilation system is installed. The system includes pieces permitting to close the ducts created between the rails and to put in place either air intakes on the outside blowing or suction ducts, or VMC type fans (controlled mechanical ventilation). In all these cases, one must monitor for the proper filtration of injected air into the system.

Hot air circulating in the extraction duct can be used for heating, ventilation or cooling of the building.

Consequently, the system permits several configurations: natural free air ventilation, mechanical ventilation by suction or extraction, or dual flow ventilation.

Thermal insulation of the building is beneficially assured by the insulating plate placed between the rails at the low part.

The insulating plate sits in the rail sections but it can also provide for overlapping the low part of the rail, which avoids the condensation effect on a cold wall in the case of a heated building. This plate is threaded in the rail sections and can subsequently be secured mechanically, possibly with wedging pieces.

The photovoltaic roof or front improves as such the building insulation by the installation of a ventilated air element, often of an intermediate temperature. This system will be efficient also in hot countries (protection of roof heat) as in cold countries (protection against cold wall effect). On the basis of the duration of sunshine, the air circulating in the element is often slightly heated by the photovoltaic heat, with the final temperature depending also on the ventilation flow rate. The system permits to do away with the effects of expansion whether the latter originates from the frame or from the heating up of the rails. The length of the rails will be calculated on the basis of the expansion risks of the frame. The plastic parts used at the junction between 2 rails permit to absorb through sliding, a slight longitudinal expansion dilation movement.

The invention will be better understood when reading the detailed description of non-limiting embodiment examples accompanied by illustrations representing respectively:

FIG. 4 represents a view in perspective of an example of embodiment of a photovoltaic cell panel support with slots for transversal gutters;

FIG. 5 represents a photovoltaic cell plate installation with air extraction;

FIG. 6 represents a photovoltaic cell plate installation with air recovery;

FIG. 7 represents an exploded view of a variant of the embodiment of the invention FIG. 8 represents an exploded view of a panel assembly FIG. 9 represents an exploded view of the assembly of two sections.

Figure 1:
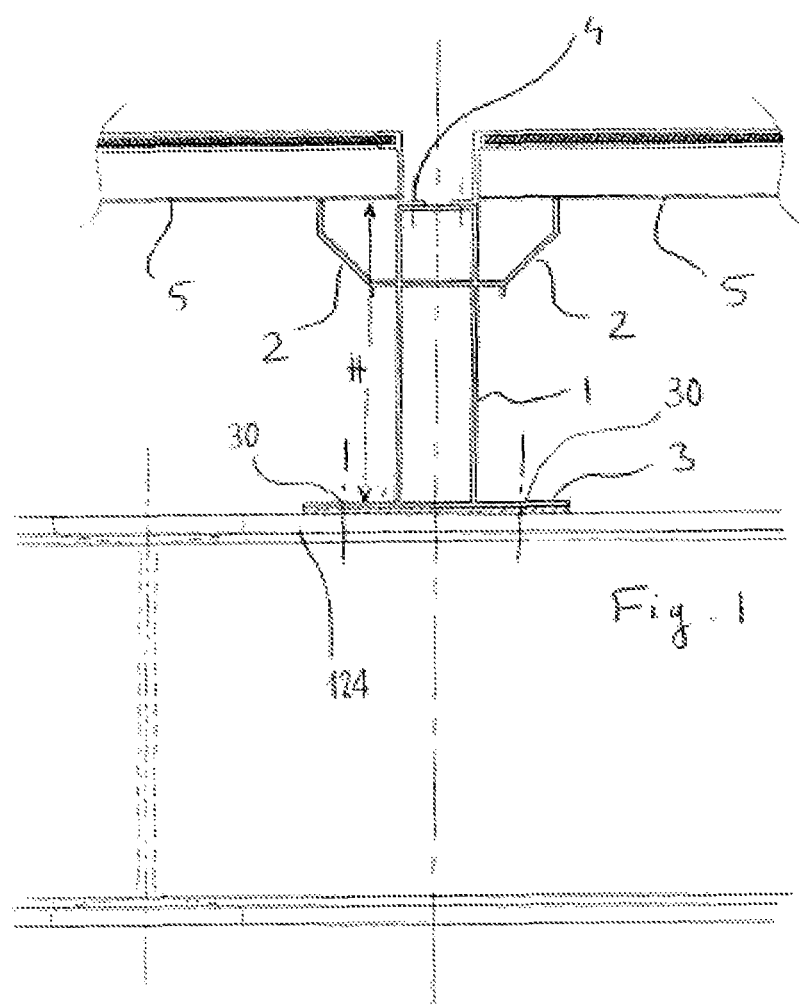
FIG. 1 represents a sectional view of a photovoltaic cell panel support according to an example of embodiment.

FIG. 1 represents a sectional view of the device; the photovoltaic cell support is made up of a section, for which the length is sized on the basis of the roof surfaces to be covered and the mechanical stresses associated with the metals used. In any event, the length of a section shall be at least equal to the length of a photovoltaic cell plate to be installed. The section consists of a central portion (1) with a height H between 5 and 25 cm; the expert in the field can determine the value by calculation. Two gutters (2) are positioned on either side of the central portion (1); the edges of said gutters shall rise in such a way that the top edges do not enter in contact with the photovoltaic cell panels (5) secured to the top of the central portion (1). The central portion (1) is preferably laid out in a straight line. At its base, it has a wider rail (3). Preferably, it forms a single unit with this rail.

Figure 2:
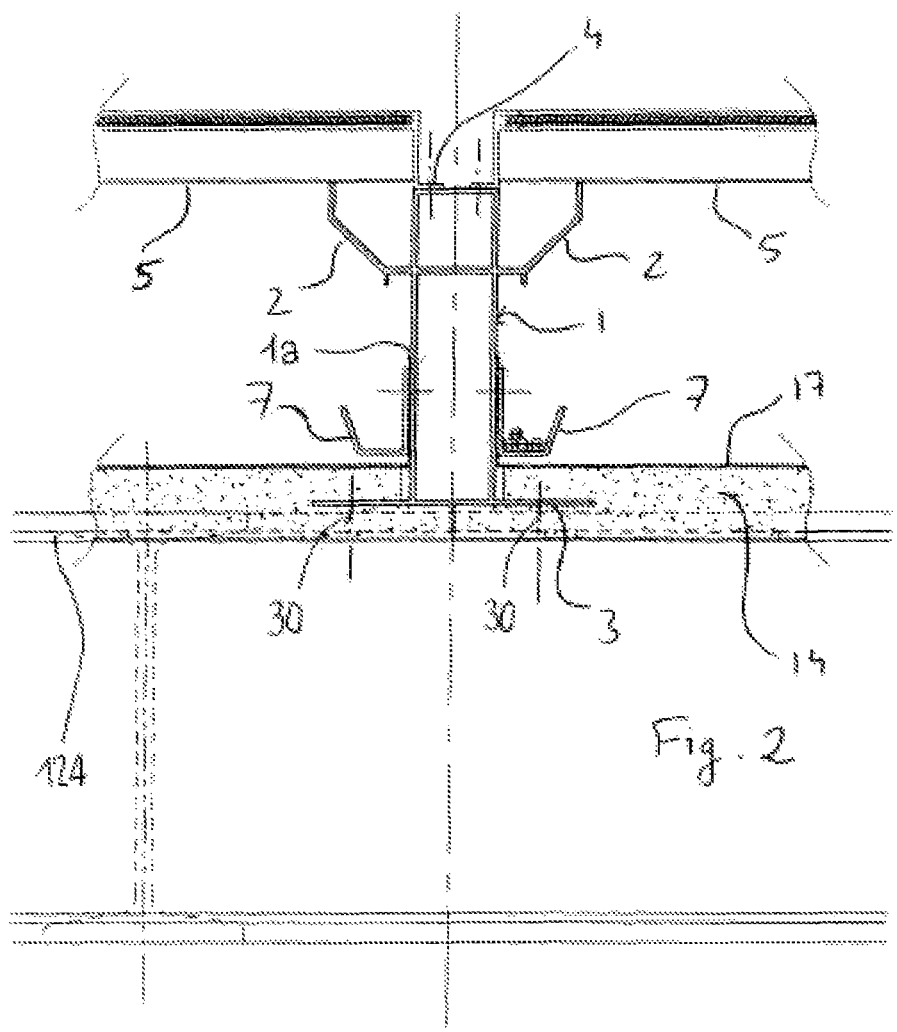
FIG. 2 represents a sectional view of a photovoltaic cell panel support according to another example of embodiment.

FIG. 2 represents an example of embodiment which copies the structure described in reference to FIG. 1, but in which two integrated or inserted gutters (7) located at the bottom, on either side of the main portion (1) and having the same length as the length of the section permit to create a fixed cableway. The rail (3) sits in an insulating material (14). An impervious sheet (17) is applied to the top surface of the insulating material. The sheet will supposedly be placed here considerably horizontally; it runs the length of the central portion (1) over a minimum height of 2 cm preferably.

Figure 3:
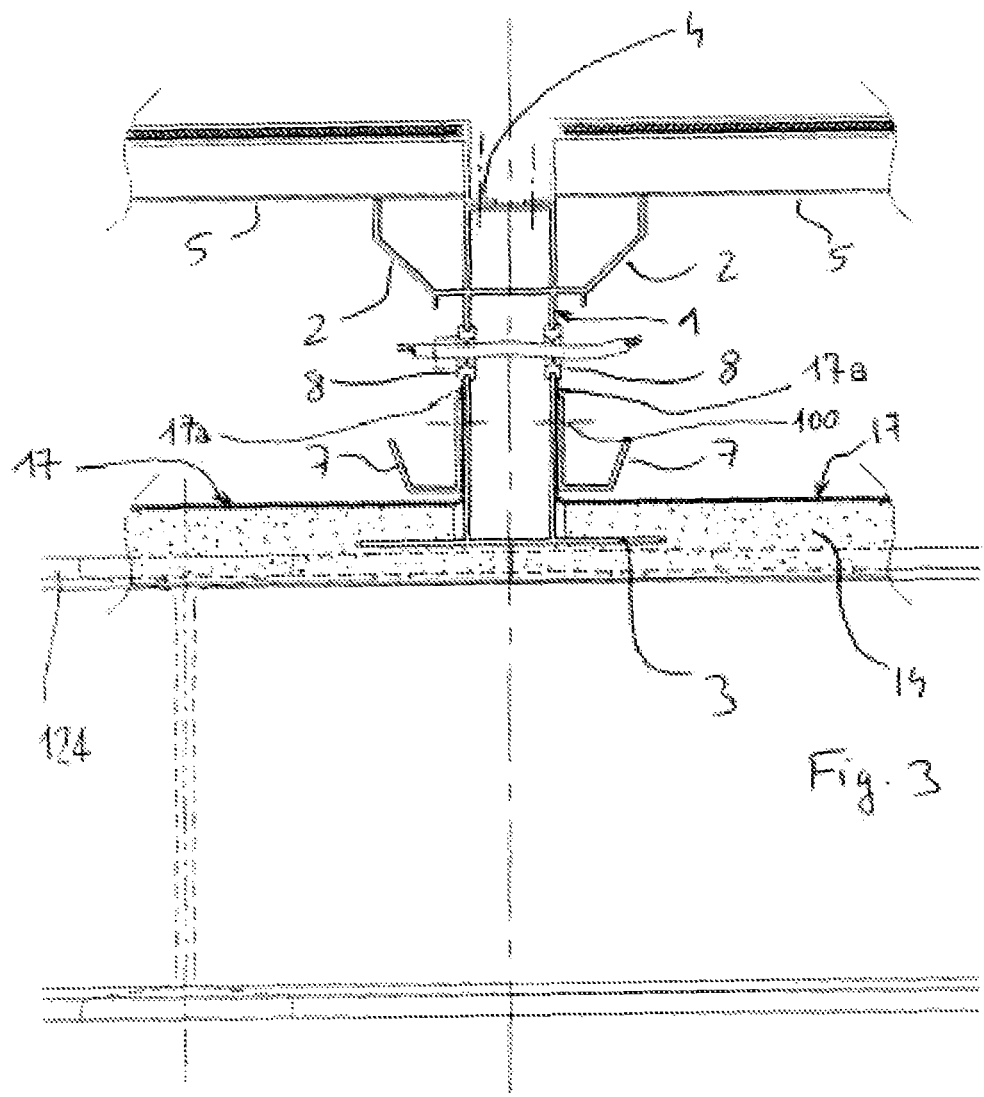
FIG. 3 represents a sectional view of a photovoltaic cell panel support according to another example of embodiment.

FIG. 7, where the view can show a roof or a front (vertical or inclined); the impervious sheet (17) is placed between one of the gutters (here 204) and the beams (124, 125). In fact, the impervious sheet (17) is even placed between one of the cableways (here 224) in the form of a gullet and said beams (124 or 125). For tightness purposes, this sheet (17) continues to run beneficially (in 17a) along one of the outside lateral walls (201a) of the central portion (201). Securing means, as in 100, keep it here in place. Assuming that the sheet is arranged considerably horizontally, it will run up the length of this wall. Still to benefit protection and insulation, on FIG. 7 for instance, one sees that the impervious sheet (17) covers beneficially a layer of thermal insulation material (14). FIG. 3 shows another example of embodiment in which the central portion (1) has holes (8) in the middle permitting the creation of transversal cable bushings. These holes must be sized by the expert in the field on the basis of the diameter of the cable or wire or of the group of cables or wires to pass through. The internal walls of the holes are covered with a protective material, for instance, a plastic ring, so as not to damage the cables or wires passing through and to ensure tightness.

With reference to FIG. 4, slots (9) of 5 to 20 cm long and a height equal to the vertical bend of the high part of the gutter (2) edges. These slots permit to position transversal gutters (10) to collect the water which might pass at the junction point of two plates installed consecutively on a support. The position of these slots depends on the length of the installed photovoltaic cell plates. The expert in the field can for instance place the slots at a regular interval along the support, so that the middle of the slot coincides with the junction point of the two plates.

FIG. 5 represents an installation of photovoltaic cells panels. In this

Example of embodiment, an insulating material plate (14) is installed in-between the rails. Two photovoltaic cell (5) plate supports (11) are installed in parallel; their respective rails (3) sit in insulating material (14) over their full length. They are secured onto the frame, possibly with wedging pieces. The photovoltaic cell panels are installed and secured on top of the central portion of each of the supports (11). A connecting part (12) will be placed at the end of the supports to produce a hermetic closure of the space formed by the two supports (11) and the photovoltaic cell plates (5). This connecting piece is drilled in its center to permit connecting a ventilation network (13) or a blowing motor (20) in the event that it is necessary to remove the heat, or the connecting piece can be connected to an air extraction network (15) or to an extraction motor (16) as is illustrated in FIG. 6 to enable recovery of the heat produced by the operation of the supported photovoltaic cells.

In FIGS. 1-4, one will also see that the central portion (1) is beneficially presented as a caisson or box and/or shows with the maintenance rail (3) an upside down T beam form. This is beneficial for the mechanical withstand.

Put in place, each central portion (1) will be placed towards the beams (124) arranged on the front of the building or on the roof in question. Assuming this last case, said beams shall define transversal frame purlins (parallel or considerably parallel to the ridge, if it is a sloping roof).

The/each central portion (1) shall then rest on these beams and/or will be secured to them. FIG. 1 shows the securing means (30). They are mounted on rail 3.

Embodiment Variant

FIG. 7 represents an exploded view of an embodiment variant of the invention. What has been said is valid for this variant and can be seen in FIG. 7 when one can assume that the beams (124, 125) can define frame purlins that are parallel or considerably parallel to the ridge (120). In this case, the/each central portion (201) shall show its extension direction (201b) according to the slope of the roof, or considerably so. If we are assuming a façade or front, the central portions (201) will then present their extension direction (201b) preferably according to a vertical line, or a nearly vertical line.

The adjacent photovoltaic panels (101, 102, 103) are supported by sections (104, 105) arranged in parallel and oriented according the direction of the steepest slope of the supporting surface of the building.

Sections (104, 105) present a base (114, 115) which permits securing with screws into the frames (124, 125) arrangement perpendicularly to the sections (104, 105).

These frames (124, 125) are frames that exist in the building to be equipped with photovoltaic panels or beams secured to the surface of a building (façade or front) or of a roof to enable the installation of the sections.

The sections in accordance with this embodiment variant consist of an extruded aluminum part or another appropriate material or of bent parts of an appropriate material, or of any part providing the same functions. The section (104, 105) is hollow and shows a central caisson or box (134, 135) with a height between 5 and 25 cm. Preferably, the height falls between 15 and 25 centimeters, to form a sufficient distance to provide a good air flow between the surface of the building and the photovoltaic panels.

According to calculation, the transversal enclosure (144, 145) can rigidify the section (104, 105). The bottom part of the central portion forming the caisson or box (134, 135) widens with a base which permits securing screws to pass through on both sides of the central portion.

The top part of the central portion forming the caisson or box (134, 135) also widens with two wings (154, 164) and (155, 165) arranged on both sides of the central portion, and sloping downward to facilitate water runoff.

With a transversal plane perpendicular to the middle line of the central portion, they form an angle between −10° and −40°.

The upper part of the section (105) shows a flat face or central part (175), perpendicular to the middle plane of the central portion (105) which closes off the top of the central portion and is extended on both sides by said inclined wings (155, 165).

The central face (175) permits to secure the panels (101, 102) through their frame presenting a strip (106, 107, 108) for purpose of securing with screws. A cover section (185) having a T section closes off the space between two adjacent photovoltaic panels, to reduce water from penetrating in the interstice. This cover section is secured between two adjacent panels or screwed onto the central face (175).

The central part (175) and the side wings (155, 165) can define a single piece forming a curved rigid skirt covering longitudinally the central part to which it might be attached with screws. Gutters (194, 204) are provided on both sides of the central portion (134). These gullets can be integrated to the section or secured on the side faces of the central portion (134). The gullets (194, 204) show a section greater than the width of the wings (154, 164) so as to permit collecting the runoff water on said wings. Preferably, the width of the wings, projected on a transversal plane, is comprised between 0.4 and 06 times the section of the gullet.

In the example described, the gullet is part of an insert, also formed by a section.

This insert has a flat median part (234, 244) to be attached to the side of the central portion (104). This solution permits to wedge between the central flank and this insert an impervious film which is pinched between the two.

The central part is extended to its bottom surface opposite the gullet by a cable way (214, 224) which permits to carry electrical wires leading to the photovoltaic panels as well as other cables/wires and fibers, as applicable.

FIG. 8 shows an exploded view of a photovoltaic panel assembly.

A thermal insulation material (200) is placed between the frame (124) and the section (105). In addition, an impervious joint (110) ensures the transversal link, in other words, perpendicularly to the section (105) between the panels (107, 108) and the following panels (109, 110).

FIG. 9 shows an exploded view of the assembly of two sections. To ensure the continuity of the sections (201, 202), a connecting piece (203) is introduced in the central portion of the sections. This connecting piece (203) shows an additional external section of the interior section of the central portion.

Likewise, continuity between the gutters is provided by a connecting piece that shows an additional section of the outside section of the gutter.

The above shows that once installed, the device and/or the aforementioned support system will form an assembly comprising:
- the beams (such as 124, 125) arranged at the front of a building, or on a roof while then defining transversal frame purlins.
- said photovoltaic panel support system or at least a so-called device for supporting photovoltaic cell panels.
- with the/each central portion (1, 201) resting on the beams (124, 125) and/or attached to them.

The invention claimed is:

1. A solar panel supporting system for supporting a plurality of solar panels, the system comprising a plurality of longitudinal supporting components arranged substantially parallel to each other, wherein each longitudinal supporting component having its lengthwise direction positioned substantially along a slope direction of the solar panel supporting system and having a length greater than a length or a width of one solar panel, and at least one longitudinal supporting component (201, 201a, 201b, 134, 135, 104, 105, 113, 115, 175) having a central portion (201), and a top portion,
wherein the top portion closes off the central portion (201) and includes a flat surface (175) at an apex of the top portion and on top of which a respective lengthwise frame portion of each of two adjacent solar panels is attached, the lengthwise frame portion running along the length of the at least one longitudinal supporting component, the flat surface being substantially perpendicular to the mid-plane of the central portion (201), the mid-plane being in a substantially vertical direction of the central portion (201),
wherein the central portion (201) has a height and width sufficient to provide structural rigidity along the length of the longitudinal supporting component to prevent deformation in the lengthwise direction of the longitudinal supporting component and to provide ventilation space to prevent overheating of the solar panels after the solar panels are attached to the flat surface of the top portion of the longitudinal supporting component.

2. The system of claim 1, further comprising a beam or structural component as the longitudinal supporting component.

3. The system of claim 1, wherein the at least one longitudinal supporting component is made of one or more components.

4. The system claim 1, wherein the system is attached to any one of the following: a transversal frame girder of a roof (124, 125), transversal frame girder of a façade (124,125), a joist, a frame, a grid, a lattice, a shell, a cable, a membrane, a wall or a façade, a wall plate, a wooden deck, a metal deck, a diaphragm, a covering, a slab, a post, or components of a building.

5. The system of claim 1, further comprising an impervious layer (17, 17a) to provide water proofing.

6. The system claim 1, further comprising a layer of thermal insulation (14, 200).

7. The system of claim 1, wherein the space formed between adjacent parallel longitudinal supporting components (201, 201a, 201b, 134, 135, 104, 105, 113, 115, 175) is an air channel.

8. The system of claim 1, wherein the system is used in lieu of braces, purlins, sub-purlins and other structural components used in a traditional construction of a roof, a façade, an outer skin or a solar system.

9. The system of claim 1, wherein the one or more longitudinal supporting components (201, 201a, 201b, 134, 135, 104, 105, 113, 115, 175) is capable of supporting external loads, wherein the external loads are attached either directly or indirectly via subsystems to one or more longitudinal supporting components, and wherein the external loads can include one or more of the following: a ceiling inside the building, construction components (200, 14, 17, 17a, 101, 102), in-door equipment, out-door equipment (101, 102), anti-fall systems, out-door loads and in-door loads.

10. The system of claim 1, further comprising a cable way (214, 224).

11. The system of claim 1, further comprising at least one gutter (194, 204).

12. The system of claim 1, further comprising a cover section (185) located between adjacent solar panels (101, 102).

13. The system of claim 1, further comprising a connecting piece (203), wherein the connecting piece (203) connects two longitudinal supporting components.

14. The system of claim 1, further comprising a base (114, 115) that extends laterally on at least one side of the central portion in a substantially horizontal plane substantially perpendicular to the central portion, and having a thickness capable of withstanding vertical loads when the solar panels are attached to the flat surface of the top portion of the longitudinal supporting component.

* * * * *